United States Patent [19]

Lackner et al.

[11] Patent Number: 4,464,134
[45] Date of Patent: Aug. 7, 1984

[54] PROCESS FOR INDUCING PERPENDICULAR ALIGNMENT OF LIQUID CRYSTALS

[75] Inventors: Anna M. Lackner, Los Angeles; John D. Margerum, Woodland Hills; Leroy J. Miller, Canoga Park, all of Calif.

[73] Assignee: Hughes Aircraft Company, El Segundo, Calif.

[21] Appl. No.: 329,452

[22] Filed: Dec. 10, 1981

[51] Int. Cl.$^3$ .................................................. G02F 1/07
[52] U.S. Cl. ........................................ 445/24; 445/17; 445/58; 427/106; 350/340
[58] Field of Search ..................... 445/9, 24, 17, 58; 350/340; 427/107, 106

[56] References Cited

U.S. PATENT DOCUMENTS

| | | | |
|---|---|---|---|
| 3,809,456 | 5/1974 | Goldmacher | 350/340 |
| 4,022,934 | 5/1977 | Miller | 350/340 |
| 4,030,997 | 6/1977 | Miller et al. | 350/340 X |
| 4,150,877 | 4/1979 | Kobale et al. | 350/341 |
| 4,354,740 | 10/1982 | Cole, Jr. | 350/340 |

*Primary Examiner*—Kenneth J. Ramsey
*Attorney, Agent, or Firm*—David W. Collins; W. J. Bethurum; A. W. Karambelas

[57] ABSTRACT

Liquid crystals are induced to assume substantially perpendicular alignment on the surfaces of substrates used to fabricate electro-optical device by causing long chain alcohols to react in the vapor phases with surface OH$^-$ inherently found on oxide coatings provided on the substrates. The process facilitates liquid crystal alignment in prefabricated electro-optical cells.

9 Claims, No Drawings

PROCESS FOR INDUCING PERPENDICULAR ALIGNMENT OF LIQUID CRYSTALS

TECHNICAL FIELD

This invention relates, generally, to the alignment of liquid crystals on the surfaces of electro-optical devices and more particularly to the inducement of perpendicular alignment of liquid crystals.

CROSS-REFERENCE TO RELATED APPLICATION

This application is related to U.S. application Ser. No. 317,964, filed Nov. 4, 1981, by Applicant Anna M. Lackner herein for "Parallel Alignment of Liquid Crystals on Conductive Substrates." The invention disclosed herein differs from that of application Ser. No. 317,964 in that the present invention relates to perpendicular alignment of liquid crystals and involves an entirely different concept and processing sequence than those of Ser. No. 317,964. Both applications are commonly assigned to Hughes Aircraft Company of Culver City, Calif.

BACKGROUND OF THE INVENTION

1. Field of the Invention

In certain types of optical display devices containing liquid crystals, it is necessary to induce alignment of the liquid crystal molecules such that the directors, or long axes, of the molecules are perpendicular to the surface of the substrate upon which the liquid crystal is brought in contact. In those instances where the device is a prefabricated cell whose elements are joined together by an adhesive seal or by a high temperature assembly method such as a glass frit seal, the inducement of perpendicular alignment of liquid crystals subsequently placed therein is particularly difficult. This invention is concerned with the solution of this problem and generally with perpendicular alignment of liquid crystals on substrate surfaces.

2. Description of the Prior Art

Many different techniques have been used for surface perpendicular (homeotropic) alignment of liquid crystals, as have been summarized by others (see: E.L. Williams, "Liquid Crystals For Electron Devices," in Noyes Data Corp., 1975, pp. 193–211; J. D. Margerum and L. J. Miller, J. Colloid and Interface Sci, 1977, pp. 562–565; and W. H. deJeu, "Physical Properties of Liquid Crystalline Material," Gordon and Breach, 1980, pp. 16–23). Three general types of methods are used for homeotropic alignment. One is the use of alignment dopants mixed into the liquid crystal mixture, such as that described in U.S. Pat. No. 3,656,834 issued to I. Haller; in U.S. Pat. No. 3,698,449 issued to Sorkin; in U.S. Pat. No. 3,809,456 issued to J. E. Goldmacher; and in Canadian Pat. No. 1061099 issued to D. Skelly. The problems with using these dopants is that they alter some of the liquid crystal characteristics, such as conductivity, they do not exhibit long-term stability, and the alignment may be temperature-dependent due to temperature effects on the partition of the dopant between the liquid crystal and the substrate surface. The second method uses surface coated films for homeotropic alignment, as reported by W. E. L. Haas in U.S. Pat. Nos. 3,687,515 and 3,803,050. The polymer coatings described in the '515 and '050 Haas patents often are lacking in long-term stability and uniformity and, as discussed below, are adversely affected by high temperature device fabrication methods. The third alignment technique, surface alteration by chemical reaction with the surface, is the most inert toward the liquid crystal and includes the use of alkoxysilanes as described by F. J. Kahn, in Applied Physics Letters, 22, 111, 1973 and the use of alcohol baths as disclosed and claimed by U.S. Pat. No. 4,022,934 issued to co-applicant Leroy J. Miller.

The Miller '934 patent is very relevant to the present invention in that it also discloses the use of long-chain alcohols on substrate surfaces to induce surface perpendicular alignment. Unlike the present invention, the Miller process uses hot, liquid baths of long-chain alcohols and amines to apply alcohol coatings to the surface of the liquid crystal substrates. The substrate surfaces are totally immersed in the baths and subsequently washed with a solvent to remove excess alcohol prior to their use for containment of liquid crystals. While the '934 Miller process is suitable for use with demountable cells, this method is not suitable for use with prefabricated displays because it would be difficult to remove the excess alcohol and because high temperature prefabrication techniques such a glass frit sealing destroy the organic alignment-inducing coating.

Therefore, there is a need for a method of inducing perpendicular alignment of liquid crystals on the surfaces of substrates previously fabricated into liquid crystal cells by high temperature assembly techniques or by adhesive sealing methods.

SUMMARY OF THE INVENTION

In a seeking to provide a process for inducing perpendicular alignment of liquid crystals within prefabricated cells which avoids most, if not all, of the disadvantages of prior art liquid crystal alignment methods while retaining all of the advantages of the prior art methods, it was discovered that by inducing a vapor phase reaction between a long chain alcohol and an oxide coated substrate, an RO group overcoated surface could be obtained which causes liquid crystals subsequently brought into contact therewith to align themselves with their directors perpendicular to the overcoated surfaces. The RO groups are derived from long chain alcohols of the formula ROH, where R is an aliphatic carbon chain having from 10 to about 24 carbon atoms. Therefore, the process of this invention includes the steps of first providing a substrate with an oxide coating and subsequently reacting the OH surface groups on said coating with an alcohol of the formula ROH in a vapor phase reaction to provide an RO group overcoating which induces perpendicular alignment of liquid crystals subsequently brought into contact therewith.

It is therefore one purpose of this invention to provide prefabricated electro-optical cells wherein liquid crystals placed therein align themselves with their directors perpendicular to the surfaces of the cell.

An additional purpose of this invention is to provide an improved method for inducing perpendicular alignment of liquid crystals on the surfaces of substrates used as electraodes in electro-optical devices.

A further purpose of this invention is to provide an inexpensive reproducible process for inducing stable perpendicular alignment of liquid crystals on substrate surfaces.

That the above-stated purposes have been achieved, and more, will be apparent upon reference to the following detailed description of the invention.

DETAILED DESCRIPTION OF THE INVENTION

In seeking to provide a process for inducing perpendicular alignment of liquid crystals in prefabricated liquid crystal cells that avoids most, if not all, of the disadvantages of the prior art liquid crystal alignment process while retaining the advantages of these processes, it has been discovered that vapors from long chain alcohols will react with oxide coatings applied to the surface of substrates, used to form liquid crystal cells, to provide an overcoating of RO groups which induce substantially perpendicular alignment of liquid crystals subsequently brought in contact therewith.

Long chain alcohols found to be suitable for use in this process are characterized by the formula ROH, where R is an aliphatic chain with the formula

$$CH_3{\text{-}}(CH_2{\text{-}})_n \qquad (1)$$

where n is an integer ranging from about 9 to 23 (i.e., a carbon chain of 10 to about 24 carbon atoms). Included in this class of alcohols are: 1-decanol, 1-dodecanol, 1-hexadecanol, 1-octadecanol, and 1-eicosanol; these materials are well known and are readily available from numerous chemical supply houses at relatively low cost.

The minimum chain length of the alcohol needed to accomplish good perpendicular alignment varies with the composition of the liquid crystal used. For some liquid crystals, (e.g. certain Schiff base mixtures), n can be as small as 9, or possibly even less for marginally acceptable perpendicular alignment. For others, n must be 15-17 or more. The higher n is, the lower the vapor pressure at a given temperature; and the rate of reaction with the surface will decrease as the vapor pressure decreases. Octadecanol, in which n is 17, is satisfactory for good perpendicular alignment of nearly all liquid crystals tested, and is considered to be the alcohol of choice.

Substrates having oxide coatings such as silicon oxide (SiO), silicon dioxide ($SiO_2$), indium-tin-oxide (ITO)/silicon dioxide mixtures, tin oxide (SnO)/$SiO_2$ mixtures and indium oxide (InO)/$SiO_2$ mixtures, are generally suitable for use in this process. However, other reflective metal electrodes such as silver or chromium plus $SiO_2$ may be utilized for certain applications. The key to obtaining a good RO group overcoated surface is to provide an oxide coating which inherently has surface hydroxyl (OH) groups thereon as is achieved by the use of SiO, $SiO_2$ or mixtures thereof. These surface OH-groups react with alcohol vapors to provide stable attachments for the alphatic chain which induces the alignment of the liquid crystals.

As used herein the phrase "liquid crystal" is intended to refer to a compound, a mixture of compounds, a mixture of compounds and a solvent, a doped compound or any combination thereof which exhibits nematogenic characteristics. Therefore, a liquid crystal cell is an electro-optical device containing a liquid crystal and having at least two substrates which function as electrodes and a means for retaining the liquid crystals therebetween.

An important advantage of the liquid crystal alignment process of this invention, referred to hereinafter as the "vapor phase reaction process", is that it can be applied to liquid crystal devices having glass frit sealants. Prior art processes, which involve organic surface treatments and/or chemically bonding organic molecules to the cell substrate surfaces before the cell is sealed, fail because organic molecules decompose at the high temperatures (>500° C.) required for glass frit processing. Therefore, by causing a reaction between the oxide coated substrate surface and alcohol molecules to occur in a vapor phase, it is possible to form Ro-groups on the surface of the substrates after they have been assembled into prefabricated cells and thus avoid the deleterious effects of high temperature cell assembly steps.

Another advantage of this vapor reaction process lies in the elimination of the prior art processing steps which are required to remove excess reactants from the device substrates prior to the introduction of the liquid crystal. When alcohol vapors are brought into contact with the oxide coated surfaces at temperatures above the condensation point of the particular alcohol in accordance with this invention, a reaction takes place which does not produce or leave by-products which contaminate liquid crystals subsequently introduced into the cell. There is no solvent removal problem, there is no unreacted alcohol to be washed off and there is no excess catalyst to be removed. This feature is significant in applications such as the fabrication of light valves, in which thick glass optical flats are used and thermal shock, which accompanies wash-off processes, can cause substrate damage.

Finally, the vapor phase reaction process of this invention is universally advantageous because it yields good quality reproducible and stable surface alignment of the liquid crystals following a simple, single-step procedure using small amounts of low cost materials.

There are two general techniques for treating coated substrates with alcohol vapors to induce a reaction between the two. One technique is to heat the substrates in an evacuated chamber in which the alcohol is heated to a slightly lower temperature. This temperature differential is created to avoid condensation of the alcohol vapor on the substrate. Open face substrates as well as internal substrates of prefabricated cells having small openings can be treated by this method. A reaction between the alcohol vapors and the substrate oxide coating occurs readily even with alcohole vapor pressures less than one Torr. This technique may be carried out in a vacuum chamber provided with a first heating means for raising the temperature of a long chain alcohol and a second heating means for raising the temperature of a liquid crystal cell to a level slightly higher than that of the alcohol.

A typical prefabricated liquid crystal cell comprises two glass substrates having indium-tin-oxide (ITO) coating and an $SiO_2$ overcoating which function as electrodes. The electrodes are separated by a spacer which functions as a sealant to provide a container that is subsequentially filled with liquid crystals through an opening.

When the temperature of the alcohol is increased, alcohol vapors emanate therefrom and diffuse throughout the evacuated chamber, thereby entering the liquid crystal cell through the opening to contact and react with the $SiO_2$-coated substrate. The vapors are conveniently allowed to remain within the chamber for about one hour or more before the temperatures are lowered and the cell allowed to cool. However, shorter periods may be acceptable. When cooled, the cell may be provided with liquid crystals through the opening without further processing, and the liquid crystals will orient themselves within the cell such that their directors are perpendicular to the surfaces of the substrates.

In the second, and preferred, technique for practicing this invention, low concentrations of the alcohol in a volatile solvent are introduced into a portion of a cell such as that described above through an opening provided for this purpose. The cell is placed in an oven and the temperature is raised to a level sufficient to quickly drive off the solvent and cause the alcohol residue to vaporize within the cell and react with the coated substrate surfaces. Again, as described above, after cooling, the cells can be directly filled with a liquid crystal without further processing.

A typical application of this process for our purposes entails the inducement of the perpendicular alignment of liquid crystals on the surfaces of conductive electrodes of ITO, SnO, chromium, silver or similar compositions coated with about 200 to 3000 Å of $SiO_2$. Display modules or test cells, using the above $SiO_2$-coated electrodes, are presealed with glass frit or with epoxy sealant, leaving two small openings for cell filling. By our first technique, they are placed in a vacuum chamber, evacuated and heated simultaneously. Alcohol vapor is introduced into the vacuum chamber at an elevated temperature ($\geq$140° C.) such that the alcohol source is at a slightly lower temperature than the display cells. This temperature differential is created to ensure that there is no alcohol condensation on the inside of the devices. However, condensation should not occur in any event if the temperature of the substrate surfaces is at least as high as the temperature of the alcohol vapor source. The cells and the alcohol are heated for at least one hour to permit a complete reaction of the alcohol and the $SiO_2$-coated electrode surfaces. After one hour, the chamber is evacuated at the elevated temperature to remove all unreacted alcohol vapors and subsequently allowed to cool. The cooled cells are then filled with liquid crystals using a vacuum fill technique. Other fill methods such as gravity or pressure filling are also suitable.

The following examples further illustrate the preferred process for practicing this invention. Examples 1 and 2 disclose the alignment process using a vacuum chamber to cause vapors to enter a prefabricated cell and react with the preferred interior cell surfaces. Examples 3 and 4 disclose the alternate process of utilizing a solvent carrier to introduce the alcohol into a prefabricated cell.

EXAMPLES

Example 1

Indium-tin-oxide electrodes were coated with 2700 Å $SiO_2$ and fabricated into a demountable cell with 1 mil Mylar spacers on the two longer sides, leaving the other two edges of the cell open. Commercial grade octadecanol ($C_{18}H_{37}OH$) and the test cell were introduced into a vacuum chamber, which was evacuated. The electrode temperature was raised to 160° C., while the temperature of the alcohol was kept below 155° C. for over 1 hour. (The reported vapor pressure of the alcohol at 155° C. is 1.2 Torr.) The system was pumped continuously while cooling down to room temperature. Afterwards, the liquid crystal, a mixture of phenyl benzoate esters, was introduced into the cell by gravity flow. Observation between crossed polarizers showed good perpendicular alignment throughout the entire cell.

Example 2

ITO electrodes with 700 Å $SiO_2$ were presealed into a test cell using Ablefilm 539-Type II epoxy sealant coated on ½ mil Mylar, leaving two ⅛"×½ mil filling slits open. Octadecanol and the presealed test cell were pumped down to 0.025 mm before heating. Alcohol vapor pressure built up to about 2.75 mm. (The reported vapor pressure of the alcohol at 180° C. is 3.8 Torr.) After 1 hour of vapor treatment, the excess alcohol was pumped out of chamber and the chamber was cooled down to room temperature. The cell was gravity filled with a redox liquid crystal mixture (dibutylferrocene and 2, 4, 7, -trinitro-9-fluorenylidenemalononitrile-doped phenyl benzoate ester) and showed good perpendicular alignment between crossed polarizers.

Example 3

The substrate and cell was the same type as described above in Examples 1 and 2. A portion of the cell was simply filled with an alcohol solution comprising a one percent solution of octadecanol in methylene chloride solvent and such cell was placed in an air oven. Following the evaporation of the solvent, the small amount of alcohol thus introduced produced adequate vapor to react with the surfaces during the heating period (e.g. 1 hr at 140° C., where $C_{18}H_{37}OH$ has a reported vapor pressure of 0.6 Torr). A heating temperature higher than 140° C. was not used in order to avoid excess flow of the Ablefilm epoxy sealant utilized in this particular example.

After cooling to room temperature, without additional cleaning or processing steps, the cell was filled with an ester type liquid crystal mixture. The perpendicular alignment quality of liquid crystal mixture was good. The perpendicular alignment quality of the liquid crystal mixture subsequently placed in the cell was good. Note that in this particular example the cell had surfaces with 700 Å thick coatings of $SiO_2$ over indium-tin-oxide electrodes. The cell had a nominal spacing of 0.0005 inches, with the parallel flat surfaces each being one inch by one inch in dimensions. The cell was fabricated with Ablefilm 539 Type II sealant on Mylar spacers, and the approximate size of the filling opening was 0.0625 inches in length.

Example 4

Indium-tin-oxide electrodes were overcoated with a thin layer of medium-angle-deposited (MAD) SiO and fabricated into demountable cells with ½ mil Mylar spacer in the two longer sides, leaving the other two edges of the cells open. The cells were then filled with a 0.2 wt % solution of octadecanol in methylene chloride and placed in an air filled oven at 140° C. for one hour. After cooling to room temperature, without additional cleaning or processing steps, the cells were filled with an ester type liquid crystal mixture. Observation between crossed polarizers showed good perpendicular alignment throughout each test cell. A total of six liquid crystal cells were tested, two samples of each with MAD SiO thickness of 50 Å, 100 Å and 150 Å, all of which showed good perpendicular alignment.

While most of the above examples illustrate the use of a vapor phase reaction process for treatment of the internal surfaces of prefabricated cells, it is apparent from Example 4 that this method is equally suitable for the treatment of any substrate surface having an oxide coating containing surface hydroxyl groups. Therefore, the processes described above are not limited to perpendicular alignment of liquid crystals on the surfaces of substrates in prefabricated cells but may be used for perpendicular alignment of liquid crystals in demountable cells also. Our tests have shown that after substrates (glass/ITO/SiO$_2$) are heated to the temperature needed for glass frit sealing (520° C.), they still yield well aligned liquid crystals when treated by this process.

INDUSTRIAL APPLICATION

The process of this invention is suitable for use in the fabrication of flat panel light display devices, light valves and other electro-optical devices where perpendicular alignment of liquid crystals on the surfaces of the device substrates is required. It simplifies the manufacturing process by facilitating cell assembly without damage to the alignment mechanism. Therefore, it is suitable for large scale commercial manufacturing operations.

What is claimed is:

1. A process for treating the surface of a substrate to induce liquid crystals subsequently brought into contact therewith to orient themselves with their directors substantially perpendicular to said surface comprising:
    first providing said substrate with an oxide coating; and
    then heating said coated substrate to a temperature adequate to prevent condensation of vaporized reactant alcohol molecules utilized in subsequent steps; and
    subsequently reacting said coating with alcohol molecules of the formula ROH in a vapor phase to provide an overcoated surface containing RO groups thereon, where R is an aliphatic carbon chain having from about 10 to about 24 carbon atoms therein.

2. The process of claim 1 wherein said oxide coating is selected from the group consisting of SiO$_2$, SiO, indium-tin-oxide/SiO$_2$, tin oxide/SiO$_2$, and indium oxide/SiO$_2$ mixtures.

3. The process of claim 1 wherein said oxide coating is SiO$_2$.

4. The process of claim 1 where said oxide coated substrate is placed within a vacuum chamber containing said alcohol and the temperature of said chamber is raised to at least about 140° C. to thereby cause vapors to emanate from said alcohol and react with said oxide coating.

5. The process of claim 1 where said substrate is reacted with vapors in an oven having its temperature elevated to at least about 140° C.

6. A process for use in the manufacture of a liquid crystal device, whose design characteristics require the prior use of high temperature cell assembly techniques, to induce liquid crystals placed therein to orient themselves perpendicular to the internal surfaces of said device comprising;
    providing substrates for said device whose surfaces are coated with an oxide;
    assembling said substrates as required to form a device comprising oxide coated internal surfaces; and
    heating said assembled substrates to a temperature adequate to prevent condensation of vaporized reactant alcohol molecules utilized in subsequent steps; and
    subsequently causing vapors from an alcohol of the formula ROH where R is an aliphatic carbon chain having from about 10 to about 24 carbon atoms to contact said device and thereby react with said coated surfaces to provide an overcoated surface containing RO groups thereon which interact with liquid crystals subsequently brought in contact therewith to cause said liquid crystals to assume substantially perpendicular alignment.

7. The process of claim 6 wherein said oxide coating comprises silicon oxide, silicon dioxide, indium-tin-oxide/SiO$_2$, tin-oxide/SiO$_2$, tine oxide/SiO$_2$ or an indium oxide/SiO$_2$ coating.

8. The process of claim 6 wherein said device is placed in a vacuum chamber contianing said alcohol and the temperature of said chamber is raised to at least about 140° C. to thereby cause vapors to emanate from said alcohol and react with said oxide coated substrates.

9. The process of claim 6 wherein said vapors are formed by first introducing a dilute solution of said alcohol in a volatile solvent into a portion of said device, and subsequently raising the temperature of said device to a level sufficient to drive off said solvent and cause said alcohol residue to vaporize within said device so that said alcohol vapors react with all oxide-coated substrate surfaces.

* * * * *